(12) United States Patent
Creek

(10) Patent No.: US 7,070,186 B2
(45) Date of Patent: Jul. 4, 2006

(54) FLANGED BOOT HAVING A ROLLING BEARING INTERFACE

(75) Inventor: Steve W. Creek, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 81 days.

(21) Appl. No.: 10/465,188

(22) Filed: Jun. 19, 2003

(65) Prior Publication Data

US 2004/0256814 A1 Dec. 23, 2004

(51) Int. Cl.
*F16J 15/38* (2006.01)

(52) U.S. Cl. .................. 277/391; 277/277; 277/390; 277/392; 277/393

(58) Field of Classification Search .................. 277/391, 277/390, 392, 393
See application file for complete search history.

(56) References Cited

U.S. PATENT DOCUMENTS 3,997,805 A * 12/1976 Dochterman ............ 310/90
4,323,254 A * 4/1982 Bertin ..................... 277/386
4,611,931 A * 9/1986 Brandenstein et al. ...... 384/477
5,894,789 A * 4/1999 Huber ........................ 100/4

OTHER PUBLICATIONS

JEEP® booted shaft interface of Daimler–Chrysler Corporation, Auburn Hills, MI, 2 pages; on the market since about 1998.

* cited by examiner

*Primary Examiner*—Enoch Peavey
(74) *Attorney, Agent, or Firm*—Laura C. Hargitt

(57) ABSTRACT

A flanged boot having a rolling bearing interface suitable for connection to two mechanical components which are movable with respect to each other, in terms of both rotational and axial movements. The flanged boot has a first annular flange at one end and a second annular at the other end. A rolling bearing, such as for example a roller (needle) or ball bearing, is press-fit onto a suitably configured structure of a first mechanical component. One of the first and second annular flanges is interfaced sealingly with respect to the rolling bearing. The other of the first and second annular flanges is sealingly connected to a second mechanical component. Either of the first or second mechanical components may be considered to be moving relative to the other.

6 Claims, 2 Drawing Sheets

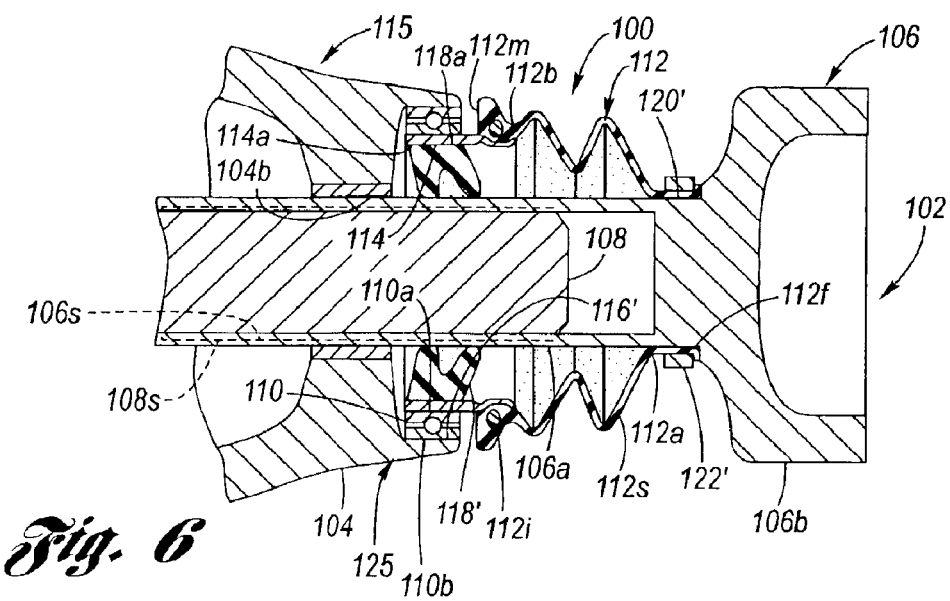
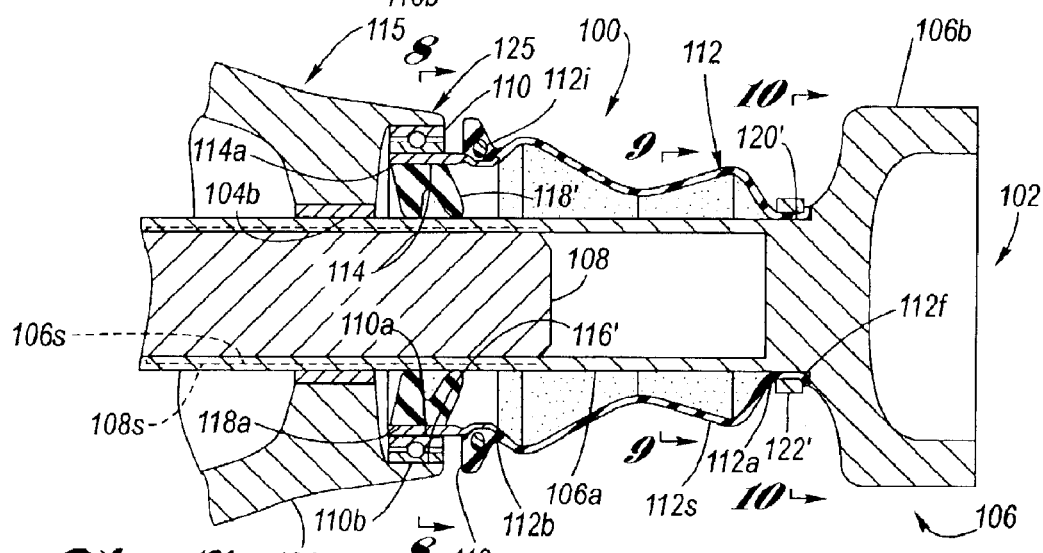
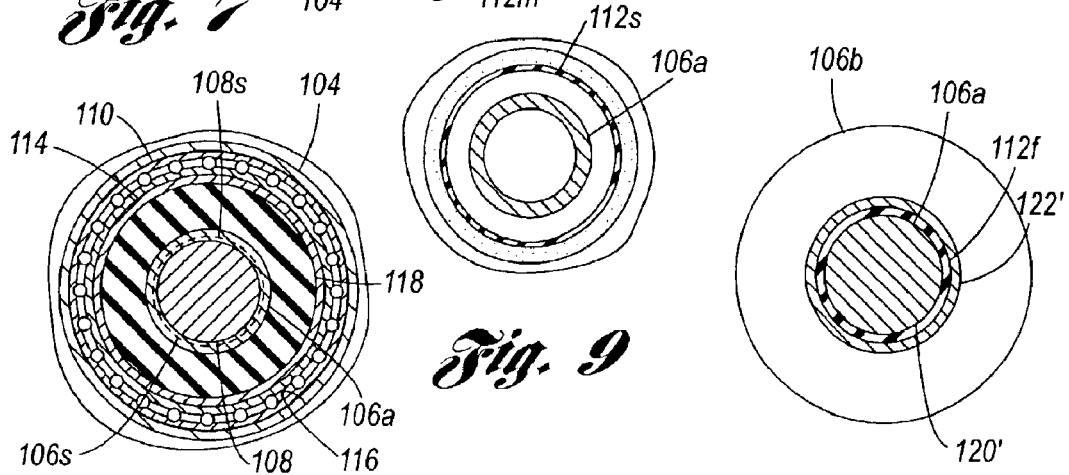

FLANGED BOOT HAVING A ROLLING BEARING INTERFACE

TECHNICAL FIELD

The present invention relates to flexible boots used to protectively envelope mechanical components, and more particularly to a boot interfaced with mechanical components which are rotatably and axially movable relative to each other.

BACKGROUND OF THE INVENTION

Mechanical components which require a clean environment in order to function properly are protectively enveloped by boots which are usually made of a convoluted (or pleated) elastomeric material. Typically, the environment of application of boots involves mechanical components which are lubricated and have certain movement. The movement may involve either or both of rotation in unison with each other and straight-line (axial) movement relative to each other. Typically, the boot is sealingly connected at its one end to one mechanical component, and connected at its other end to the other mechanical component. The boot has flexibility and sealing properties which provide an environmentally protected space therewithin. The boot serves to maintain a clean environment therewithin free of all exterior contaminants, while at the same time confining the lubricants to the boot interior. An example of an automotive application, would be at the constant velocity joint of front wheel drive vehicles.

While boots are used in a variety of automotive applications, this is not universally the case for technical reasons, as for example in certain driveline configurations. In this regard, beam axle applications frequently utilize a splined slip mechanism for the connection from the propshaft (also known as a drive shaft) to the powertrain output.

An interesting example is a splined slip mechanism, which includes a female splined slip yoke shaft meshingly mated to a male splined output shaft. The slip yoke is connected to the propeller shaft via a U-joint, and the output shaft is connected with the transmission. This splined slip mechanism typically utilizes a transmission housing bushing to guide the machined outside diameter of the slip yoke shaft, and this bushing interface is protected by an annular seal. The annular seal is seated in an annular seal seat of the transmission housing in concentric relation to the slip yoke and output shafts, and thereby serves to protect the interface between the transmission housing and the slip yoke shaft from contamination during both rotary and axial movements of the slip yoke relative to the bushing. However, even with modern seal technology applied to this interface, there remains the possibility of susceptibility to seal wear due to contamination ingress, which results in transmission/transfercase fluid leaks and other concerns. A boot is not suitable for this application because of the relative rotation of the mechanical components (that is, the transmission housing relative to the slip yoke shaft).

Accordingly, it would be beneficial if somehow a boot could be adapted to an application where relative axial and rotational movements of the mechanical components are involved.

SUMMARY OF THE INVENTION

The present invention is a flanged boot having a rolling bearing interface suitable for connection to two mechanical components which are movable with respect to each other, both in terms of rotational and axial movements.

The flanged boot is composed of a conventional boot material, as for example a convoluted (pleated) flexible elastomeric material, having at one end a first annular flange and at the other end a second annular flange. Preferably, the first annular flange is an integral boot flange and the second annular flange is a connector flange sealingly interfaced with the second end.

A rolling bearing having inner and outer races, such as for example a roller bearing or ball bearing, has one race thereof connected to a suitably configured structure of a first mechanical component. One of the first and second annular flanges is sealingly interfaced with the other race of the rolling bearing. The other of the first and second flanges of the flanged boot is sealingly connected to a second mechanical component.

Either of the first or second mechanical components may be considered to be moving relative to the other, in the sense of relation to a coordinate system, as for example a coordinate system fixed in space relative to the frame of a motor vehicle. In this regard, the first mechanical component could be, for example, a transmission housing which is "stationary" and the second mechanical component could be, for example, a component shaft of propeller shaft having rotational and axial movements relative to the transmission housing. Further in this regard, either of the first and second annular flanges can be connected to, respectively, either of the first and second mechanical components, wherein in certain arrangements the flanged boot is viewed as being "stationary" and in other arrangements the flanged boot is viewed as being "rotating" depending on which of the mechanical components is viewed as "rotating" and whether or not that component is interfaced with the rolling bearing.

Accordingly, it is an object of the present invention to provide a flexible boot for environmentally protecting a connection between first and second mechanical components having rotational movement with respect to each other, wherein the boot is interfaced with one of the mechanical components via a rolling bearing.

This and additional objects, features and advantages of the present invention will become clearer from the following specification of a preferred embodiment.

BRIEF DESCRIPTION OF THE DRAWINGS

FIG. 6 is a sectional side view of the bearing interfaced flanged boot according to the present invention, shown in a second operational example with respect to the splined slip mechanism.

FIG. 7 is a sectional side view as in FIG. 6, wherein the slip yoke has axially moved relative to the output shaft.

FIG. 8 is a sectional view seen along line 8—8 of FIG. 7.

FIG. 9 is a sectional view seen along line 9—9 of FIG. 7.

FIG. 10 is a sectional view seen along line 10—10 of FIG. 7.

DESCRIPTION OF THE PREFERRED EMBODIMENT

Figure 1:
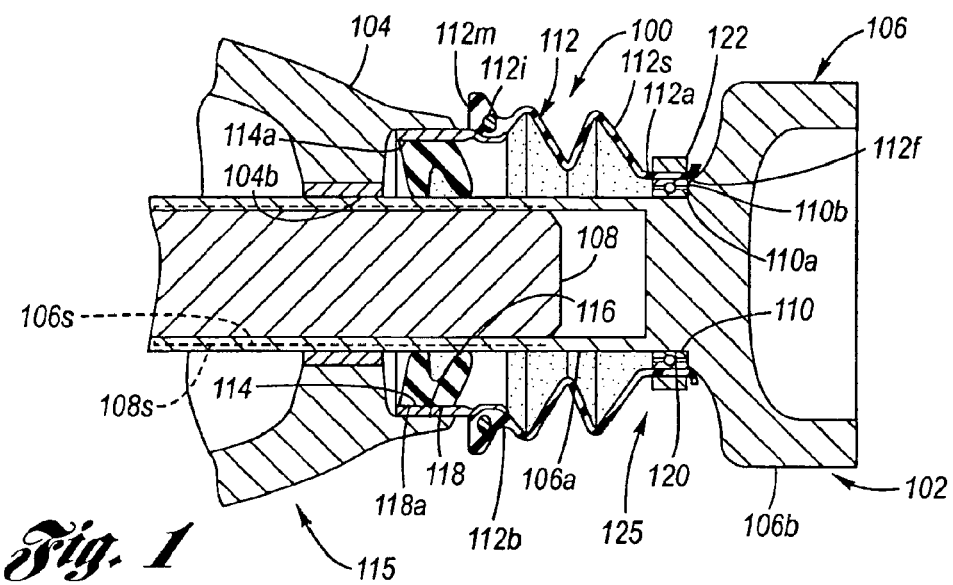
FIG. 1 is a sectional side view of a bearing interfaced flanged boot according to the present invention, shown in a first operational example with respect to a splined slip mechanism involving a slip yoke shaft, a transmission case and an output shaft of the transmission.

Referring now to the Drawing, FIGS. 1 through 5 depict a first example of operation of the bearing interfaced flanged boot 100 according to the present invention, and FIGS. 6 through 10 depict a second example of operation of the bearing interfaced flanged boot according to the present invention. In either example, the bearing interfaced flanged boot 100 is interfaced with a slip yoke mechanism 102 having relatively rotating and axially moving mechanical components in the form of a transmission (transfer case, or gearbox, etc.) housing 104 and a slip yoke shaft 106a of a slip yoke 106.

The slip yoke 106 has slip yoke ears 106b for forming a component of a U-joint connection to a propeller (drive) shaft. The slip yoke 106 is drivingly engaged with respect to an output shaft 108 of a transmission (transfer case, gear box, etc.) 115 having the transmission housing 104. The slip yoke shaft 106a is female, having internal splines 106s. The output shaft 108 is male, having external splines 108s. The internal and external splines 106s, 108s are gearingly meshed with each other so that rotation of the output shaft is transmitted in unison to the slip yoke, while allowing the slip yoke to axially move relative to the output shaft (see comparatively FIGS. 1 and 2, and FIGS. 6 and 7).

As mentioned hereinabove, it is conventional practice to seal the slip yoke mechanism via an annular seal seated in an annular seal seat of the transmission housing. As will be seen hereinbelow, with no, or relatively little, modification of the conventional structures of the transmission housing and slip yoke, the bearing interfaced flanged boot 100 may be sealingly interfaced therewith. In this regard, the bearing interfaced flanged boot 100 solves the problem of accommodating relative rotation between mechanical components via a rolling bearing 110 sealingly interfaced with a flanged boot 112. Accordingly, at a selected location of relative rotation between the mechanical components, a rolling bearing interface 125 is provided which allows the flanged boot to be sealingly interfaced with the relatively rotating mechanical components, in this example one mechanical component is the transmission housing 104, and the other mechanical component is the slip yoke shaft 106a.

The flanged boot 112 has generally a cylindrical shape having annular convolutions, or annular pleats, 112c, which allow for its axial expansion, defined by a sidewall 112s composed of a conventional, flexible elastomeric material. One end 112a of the flanged boot 112 has an annular boot flange 112f. At the other end 112b of the flanged boot 112 is a ribbed mouth 112m. An annular connector flange 114 is sealingly interfaced interiorly with respect to the ribbed mouth 112m, which may be aided by a plastic insert 112i. The connector flange 114 may be press-fit or be internally molded. The connector flange 114 may be composed of plastic or metal (a corrosion resistant metal being preferred).

Referring now to FIGS. 1 through 5, the first exemplar application of the bearing interfaced flanged boot 100 will be detailed with respect to the slip yoke mechanism 102.

The transmission housing 104 has a bushing 104b and an adjacent recessed annular seal seat 116. A generally conventional annular seal 118 is provided which has an outer surface 118a that is pressed into the free (or open) end 114a of the connector flange 114. Then the free end 114a of the connector flange 114 (inherently along with the interiorly disposed annular seal 118), is press-fit into the annular seal seat 116.

The above mentioned rolling bearing 110 has an inner race 110a that is rollingly rotatable with respect to an outer race 110b, as for example in the form of a roller (needle) bearing or a ball bearing. The slip yoke 106 has an annular bearing seat 120 onto which the inner race 110a of the rolling bearing 110 is press-fit.

The slip yoke shaft 106a is placed into the transmission housing 104 at the seal seat 116 such that the slip yoke shaft receives thereinside the output shaft 108, wherein the internal splines 106s gearingly mesh with respect to the external splines 108s, wherein the machined (polished) outside surface of the slip yoke shaft guidably abuts the bushing 104b, and wherein the annular seal 118 sealingly abuts the outside surface of the slip yoke shaft. The boot flange 112f of the flanged boot 112 is then placed over the outer race 110b of the rolling bearing 110. Next, the bearing flange 112f is clamped sealingly onto the outer race 110b by tightening of an annular clamp 122.

In the application shown at FIGS. 1 through 5, the flanged boot 112 is viewed as being "stationary" in the sense that it is stationary with respect to the transmission housing 104, while the slip yoke 106 rotates relative thereto. The bearing interfaced flanged boot 100 flexibly accommodates axial movements of the slip yoke 106 relative to the transmission housing 104, as well as bearingly accommodates rotation as between the transmission housing and the slip yoke, all the while providing a perfectly sealed environment therewithin.

Referring now to FIGS. 6 through 10, the second exemplar application of the bearing interfaced flanged boot 100 will be detailed with respect to the slip yoke mechanism 102.

Figure 2:
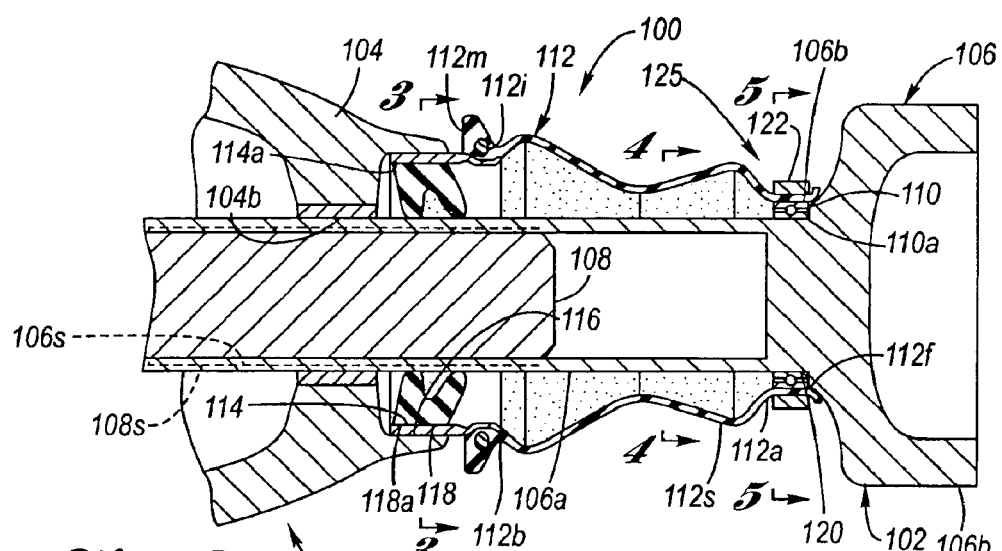
FIG. 2 is a sectional side view as in FIG. 1, wherein the slip yoke has axially moved relative to the output shaft.
Figures 3, 4, 5:
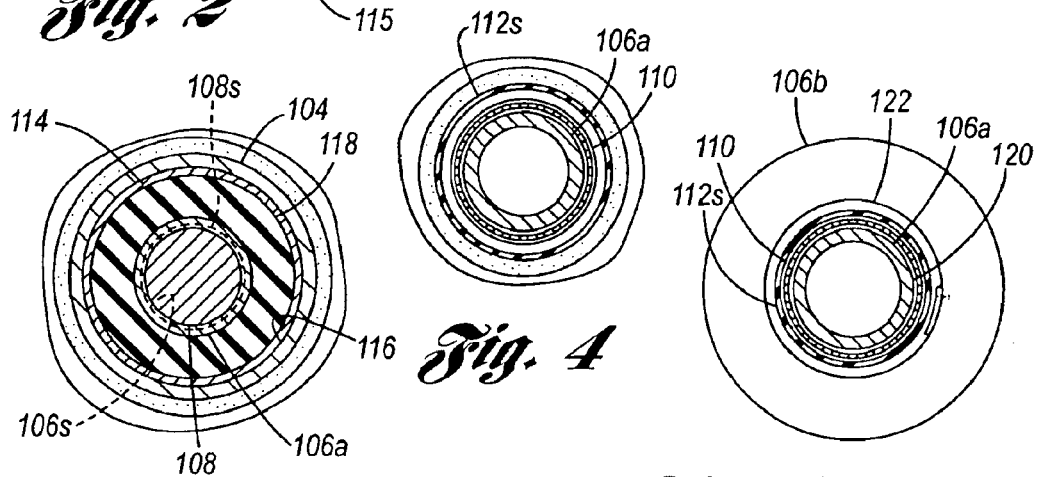
FIG. 3 is a sectional view seen along line 3—3 of FIG. 2.
FIG. 4 is a sectional view seen along line 4—4 of FIG. 2.
FIG. 5 is a sectional view seen along line 5—5 of FIG. 2.

The transmission housing 104 again has the bushing 104b and the adjacent recessed annular seal seat 116' (which may be enlarged from that shown in FIGS. 1, 2 and 3). The flanged boot 112 again has the boot flange 112f and the annular connector flange 114 sealingly interfaced interiorly with respect to the ribbed mouth 112m, preferably aided by the plastic insert 112i.

The generally conventional annular seal 118' is provided (perhaps smaller in scale than that depicted in FIGS. 1, 2 and 3, depending upon the size of the seal seat 116) which has an outer surface 118a that is pressed into the free (open) end 114a of the connector flange 114 (the free end would be resized commensurately with respect to any resizing of the seal seat and annular seal). A rolling bearing 110, as above exemplified by a roller (needle) or ball bearing, is press-fit into the seal seat 116' such that the outer race 110b abuts the seal seat. Then the free end 114a of the connector flange 114 (inherently along with the interiorly disposed annular seal 118), is placed into the annular seal seat 116 by a press-fit with respect to the inner race 110a of the rolling bearing 110.

The slip yoke shaft 106a is placed into the transmission housing 104 in the manner recounted hereinabove with respect to FIGS. 1 through 5, wherein the internal splines 106s gearingly engage the external splines 108s, wherein the slip yoke shaft guidably abuts the bushing 104b, and wherein the slip yoke shaft is sealed by the annular seal 118'. The boot flange 112f of the flanged boot 112 is then placed over an annular flange seat 120' of the slip yoke shaft 106a. Next, the boot flange 112f is clamped sealingly onto the flange seat 120' by tightening of an annular clamp 122'.

In the application shown at FIGS. 6 through 10, the flanged boot 112 is viewed as being "rotational" in that it rotates with respect to the transmission housing 104, while it is stationary with respect to the slip yoke 106 (which itself rotates relative to the transmission housing). The bearing interfaced flanged boot 100 flexibly accommodates axial movements of the slip yoke 106 relative to the transmission housing 104, as well as bearingly accommodates rotation as between the transmission housing and the slip yoke, all the while providing a perfectly sealed environment therewithin.

The superior benefit of either application is the complete sealing of the polished exterior surface of the slip yoke shaft, keeping away all contamination. And, since the annular seal will not encounter any debris, its life would be dramatically improved (over a conventional application in which it is exposed).

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A boot protected mechanical components connection, comprising:
    a first mechanical component:
    a second mechanical component, wherein said first and second mechanical components are rotatably movable relative to each other;
    a boot having a first annular flange at a first end of said boot and a second annular flange at a second end of said boot; and
    a rolling bearing having an inner race and an outer race, said inner and outer races being rollingly rotatable relative to each other, one of said inner and outer races being connected to a selected one of said first and second mechanical components;
    wherein one of said first and second annular flanges is sealingly connected to the outer of said inner and outer races of said rolling bearing such that said boot is free of sealing engagement with the one of said first and second mechanical components and with any structures stationarily connected thereto:
    wherein the other of said first and second flanges is sealingly connected to the other of said first and second mechanical components;
    wherein said first mechanical component comprises one of a housing and a shaft rotatable relative to said housing, and wherein said second mechanical component comprises the other of said shaft and said housing;
    wherein said first flange comprises an annular connector flange sealingly connected to said first end of said boot;
    said housing having an annular seal seat concentrically disposed relative to said shaft;
    an annular seal sealingly disposed within said connector flange at a five end thereof; and
    said shaft having an annular flange seat formed thereon;
    wherein said rolling bearing, said seal and said free end of said connector flange are disposed within said seal seat, wherein said outer race is sealingly connected to said seal seat, wherein said inner race is sealingly connected to said connector flange, and wherein said second flange is sealingly connected to said shaft.

2. The boot protected connection of claim 1, wherein said shaft comprises a female slip yoke shaft having internal splines; said boot protected connection further comprising:
    a male output shaft rotatably interfaced with said housing, said male output shaft having external splines which are gearingly meshed with said internal splines of said female slip yoke shaft such that said female slip yoke shaft rotates in unison with said male output shaft and is further axially movable with respect thereto.

3. The boot protected connection of claim 2, wherein said rolling bearing is a selected one of a roller bearing and a ball bearing.

4. A boot protected mechanical components connection, comprising:
    a first mechanical component;
    a second mechanical component, wherein said first and second mechanical components are rotatably movable relative to each other;
    a boot having a first annular flange at a first end of said boot and a second annular flange at a second end of said boot; and
    a rolling bearing having an inner race and an outer race, said inner and outer races being rollingly rotatable relative to each other, one of said inner and outer races being connected to a selected one of said first and second mechanical components;
    wherein one of said first and second annular flanges is sealingly connected to the other of said inner and outer races of said rolling bearing such that said boot is free of sealing engagement with the one of said first and second mechanical components and with any structures stationarily connected thereto;
    wherein the other of said first and second flanges is sealingly connected to the other of said first and second mechanical components;
    wherein said first mechanical component comprises one of a housing and a shaft rotatable relative to said housing, and wherein said second mechanical component comprises the other of said shaft and said housing;
    wherein said boot is generally cylindrically shaped having a plurality of annular convolutions;
    wherein said first flange comprises an annular connector flange sealingly connected to said first end of said boot;
    said housing having an annular seal seat concentrically disposed relative to said shaft;
    an annular seal sealingly disposed within said connector flange at a free end thereof; and
    said shaft having an annular bearing seat formed thereon;
    wherein said seal and said free end of said connector flange are disposed within said seal seat in sealing relation thereto; and wherein said inner race of said rolling bearing is sealingly mounted to said bearing seat, and wherein said second flange is sealingly connected to said outer race of said rolling bearing.

5. The boot protected connection of claim 4, wherein said shaft comprises a female slip yoke shaft having internal splines; further comprising:
    a male output shaft rotatably interfaced with said housing, said male output shaft having external splines which are gearingly interfaced with said internal splines of said female slip yoke such that said female slip yoke rotates in unison with said male output shaft and is further axially movable with respect thereto.

6. The boot protected connection of claim 5, wherein said rolling bearing is a selected one of a roller bearing and a ball bearing.

* * * * *